US012561106B2

(12) United States Patent
Li

(10) Patent No.: US 12,561,106 B2
(45) Date of Patent: Feb. 24, 2026

(54) DISPLAY METHOD AND SYSTEM

(71) Applicant: Lenovo (Beijing) Limited, Beijing (CN)

(72) Inventor: Hongwei Li, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 72 days.

(21) Appl. No.: 18/745,992

(22) Filed: Jun. 17, 2024

(65) Prior Publication Data

US 2025/0004688 A1     Jan. 2, 2025

(30) Foreign Application Priority Data

Jun. 30, 2023     (CN) .......................... 202310803797.8

(51) Int. Cl.
*G06F 3/14*         (2006.01)
*G09G 5/00*         (2006.01)
*G09G 5/373*        (2006.01)
*G09G 5/377*        (2006.01)

(52) U.S. Cl.
CPC ........... *G06F 3/1454* (2013.01); *G09G 5/373* (2013.01); *G09G 5/377* (2013.01); *G09G 2370/042* (2013.01)

(58) Field of Classification Search
CPC ....................... G06F 3/1454; G09G 2370/042; G09G 5/373; G09G 5/377
See application file for complete search history.

(56) References Cited

U.S. PATENT DOCUMENTS

2014/0236953 A1* 8/2014 Rapaport .............. G06F 16/285
                                                                                        707/740
2016/0212358 A1* 7/2016 Shikata ................ H04N 13/286

* cited by examiner

*Primary Examiner* — Insa Sadio
(74) *Attorney, Agent, or Firm* — ANOVA LAW GROUP, PLLC

(57)         ABSTRACT

The present disclosure discloses a display method and a system. The display method is performed by a first device and includes: sending a first content to a second device, where the first device is in a first display mode, and the first display mode includes at least one first display area determined in a first manner; obtaining a display instruction of a second content; and switching to a second display mode and sending the second content to the second device. The second device is configured to display the first content of the first display area. The second display mode includes a second display area determined in a second manner. The second device is configured to display the second content of the second display area. The first manner and the second manner are based on different display hardware information for determining display areas.

20 Claims, 5 Drawing Sheets

Micro OLED display

/ 102

101

Function buttons and speakers

USB-C connection

Sending, by a first device in a first display mode, a first content to a second device                    S101

Obtaining a display instruction of a second content                    S102

Switching, by the first device, to a second display mode and sending the second content to the second device                    S103

First display mode

Second display mode

DISPLAY METHOD AND SYSTEM

CROSS-REFERENCE TO RELATED APPLICATION

The present disclosure claims priority to Chinese Patent Application No. 202310803797.8, filed on Jun. 30, 2023, the content of which is incorporated herein by reference in its entirety.

TECHNICAL FIELD

The present disclosure relates to the field of information processing technology, and more specifically, relates to a display method and device system.

BACKGROUND

Data can be transmitted between multiple devices. In cross-device display application scenarios, due to the current limited variety of cross-device display modes, certain content to be displayed may not achieve optimal visual results under the current display mode, thereby diminishing user experience.

SUMMARY

One aspect of the present disclosure provides a method for displaying. The method is performed by a first device, and the method includes: sending a first content to a second device, where the first device is in a first display mode, the first display mode includes at least one first display area determined in a first manner, and the second device is configured to display the first content of the first display area; obtaining a display instruction of a second content; and switching to a second display mode and sending the second content to the second device. The second display mode includes a second display area determined in a second manner. The second device is configured to display the second content of the second display area. The first manner and the second manner are based on different display hardware information for determining display areas.

Another aspect of the present disclosure provides a display system. The display system includes a first device. The first device includes an interface apparatus for connecting to a second device and a processing apparatus for determining to-be-displayed contents and display areas. The first device includes a first display mode and a second display mode. In the first display mode, the processing apparatus is configured to determine at least one first display area in a first manner and send a first content to the second device, enabling the second device to display the first content of the first display area. In the second display mode, the processing apparatus is configured to determine a second display area in a second manner and send a second content to the second device, enabling the second device to display the second content of the second display area. The first manner and the second manner are based on different display hardware information for determining display areas.

BRIEF DESCRIPTION OF THE DRAWINGS

In order to further illustrate the technical solutions in the embodiments of the present disclosure, a brief introduction is provided below for the drawings. Apparently, the drawings in the following description are merely some embodiments of the present disclosure. Those of ordinary skill in the art may also obtain other drawings based on the provided drawings without exerting creative efforts.

DETAILED DESCRIPTION

The technical solutions in the embodiments of the present disclosure will be described below with reference to the accompanying drawings in the embodiments of the present disclosure. Obviously, the described embodiments are only some of the embodiments of the present disclosure, rather than all of the embodiments. Based on the embodiments in the present disclosure, all other embodiments obtained by those of ordinary skill in the art without creative efforts fall within the scope of protection of the present disclosure.

The terms "first" and "second" are used for descriptive purposes only and should not be construed as indicating or implying any relative importance or indicating the quantity of the indicated technical features. Features designated with "first" or "second" may expressly or impliedly include one or more of these features. Furthermore, terms such as "include" and "have," and their variations as used in the description of the present disclosure, are intended to cover non-exclusive inclusion. For example, a process, method, system, product, or device including a series of steps or modules is not limited to the steps or modules listed, but may optionally include other unlisted steps or modules, or may optionally include additional steps or modules inherent to these processes, methods, products, or devices.

Currently, in some virtual reality or augmented display reality interactive applications, the augmented reality device or virtual reality device outputs at least one virtual display area located in space, thereby achieving the purpose of expanding the display area of electronic devices. However, in application scenarios with multiple virtual display areas, the display effects of certain specific to-be-displayed content may not meet user experience requirements. In view of this, the embodiments of the present disclosure provide a display method that may meet the user's demand for displaying various display contents based on virtual reality or augmented reality.

Figure 1:
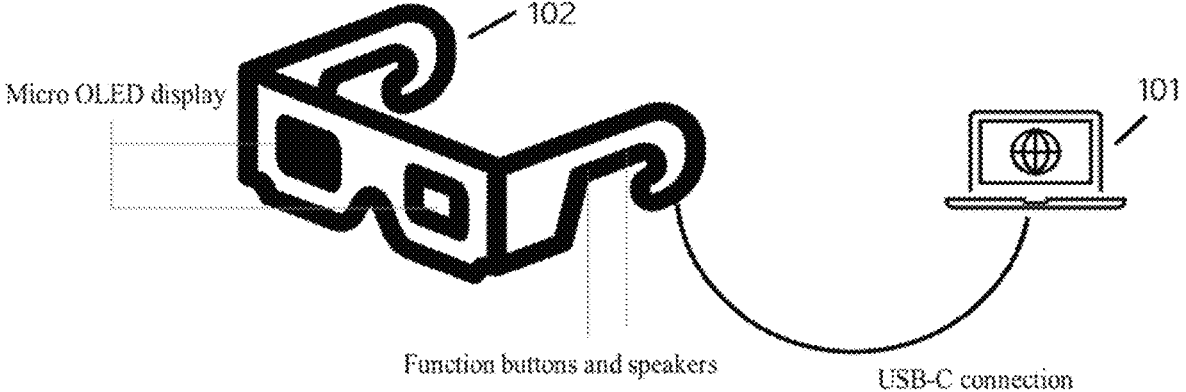
FIG. 1 illustrates an application scenario provided in some embodiments of the present disclosure.

FIG. 1 is a schematic diagram of an application scenario provided according to some embodiments of the present disclosure. The application scenario includes a first device 101 and a second device 102. In FIG. 1, the first device 101 is exemplified as a laptop computer, and may also include other types of electronic devices, such as hosts, desktop computers, etc. The second device 102 may include a device with display function, such as a large-screen display device with a screen larger than a common physical display screen. The second device 102 may include a display device with ultra-high resolution and may also include a three-dimensional display device with different effect from ordinary two-dimensional display. For example, in FIG. 1, the second device 102 is exemplified as VR (Virtual Reality) glasses.

The corresponding device may also include other virtual reality or augmented reality devices. For example, the second device 102 may also be an AR (Augmented Reality) head-mounted display device. The second device may include multiple functional components, such as function buttons and speakers, and may also include micro OLED displays, etc.

The first device 101 may include multiple functional components. For example, the first device may include an interface apparatus, may be connected to other devices to achieve data transmission and interaction. Specifically, the interface apparatus may include a network interface, such as a wireless network interface or a wired network interface, to establish network communication connections with other devices by the network interface. The first device may be connected to the second device by the interface apparatus (for example, the first device and the second device may be connected by a USB-C interface), and send relevant data to the second device, such as sending a to-be-displayed content to the second device by the interface apparatus. Correspondingly, the interface apparatus may also include an external memory interface, USB interface, etc. For example, an external storage apparatus may be connected by an external memory interface, and data to be stored in the first device may be transferred to the external storage apparatus by the external memory interface.

Furthermore, the first device may include a processing apparatus. The processing apparatus may be configured to process the relevant data generated by the first device. In some embodiments of the present disclosure, the processing apparatus may be configured to determine to-be-displayed contents and display areas. Specifically, the processing apparatus may be configured to determine at least one first display area in a first manner and send a first content to a second device, enabling the second device to display the first content of the first display area. The processing apparatus may also be configured to determine a second display area in a second manner and send a second content to the second device, enabling the second device to display the second content of the second display area. Specifically, the processing apparatus may include a CPU (Central Processing Unit), a GPU (Graphics Processing Unit), a DSP (Digital Signal Processor), a controller, etc.

The first device 101 may be installed with various applications (App), such as a chat application for chatting, an audio player application for audio playback, a video application for video playback, an office application for document processing, etc. Additionally, the first device may include applications capable of interacting with virtual reality devices or augmented display devices. For example, as shown in FIG. 1, the first device may also include an application for VR glasses, and interact with the second device 102, that is VR glasses, based on the application for VR glasses, thereby achieving VR display experience for users.

The first device 101 may project the content that needs to be displayed to the second device 102, that is VR glasses, allowing users to view the displayed content by VR glasses and achieve an immersive experience. In the illustration of FIG. 1, the first device is depicted as a laptop computer with its own display screen, and the content that the first device needs to display may be the screen display content of the device itself. Correspondingly, when the first device is an electronic device such as a host that does not have its own display screen, the content that the first device needs to display may be content that requires connection to an external display device for displaying. Furthermore, when multiple applications provide to-be-displayed contents to the first device 101 in the first display mode, VR glasses may display the interfaces of multiple applications separately in different display areas in the virtual environment of three-dimensional space. This display mode may be referred to as virtual multi-screen display mode. In this display mode, the screen will not be obstructed, and the user's visual experience may be enhanced due to the larger display provided by VR glasses. Correspondingly, when the first device needs to display a specific content in the first display mode, but the display effect of the specific content in the first display area in the first display mode cannot meet the user's experience requirements. For example, some display content cannot be clearly displayed, or some content appears as a black screen, the first device may switch to the second display mode to display the specific content, thereby meeting the user's visual experience requirements. Therefore, the present disclosure may solve the problem of poor display effect of specific contents in the virtual multi-screen mode, while ensuring that users continue to experience the visual effects of virtual reality or augmented reality. For example, when the second device is an ultra-high-definition display device, in the first display mode, multiple first display areas with high-resolution display effects may be obtained by simulating the high resolution of the second device, and the first display areas may include multiple virtually generated areas with high-resolution display effects; and in the second display mode, the second content may be directly displayed on the physical display screen of the second device. Detailed explanations of various display modes corresponding to the application scenario and the corresponding data processing processes will be provided in subsequent embodiments of the present disclosure.

Figure 2:
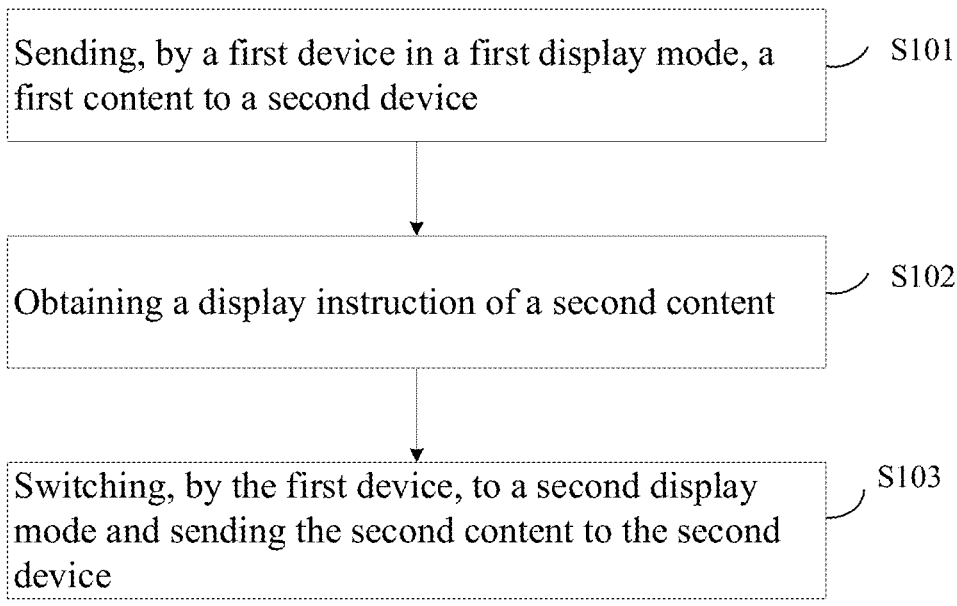
FIG. 2 illustrates a display method provided in some embodiments of the present disclosure.

FIG. 2 is a flowchart illustrating a display method provided in some embodiments of the present disclosure. The method may include the following steps:

S101: sending, by a first device in a first display mode, a first content to a second device;

S102: obtaining a display instruction of a second content; and

S103: switching, by the first device, to a second display mode and sending the second content to the second device.

Where, the first display mode includes at least one first display area determined in a first manner, and the second device is configured to display the first content of the first display area. The second display mode includes a second display area determined in a second manner, and the second device is configured to display the second content of the second display area. The first manner and the second manner are based on different display hardware information for determining display areas.

Some embodiments of the present disclosure are applicable in virtual reality or augmented reality interactive applications. The first device may be a device with its own display screen, or a device without a display screen that may achieve data display through an external display device. The second device may be a device with a display, such as a wearable device with a head-mounted display screen. Specifically, the second device may be a virtual reality device, an augmented reality device, a mixed reality device, etc. Therefore, the second device may be configured to assist the first device in displaying content. For example, the second device may display content that needs to be output by the first device without a display screen. When the first device includes a display screen, the second device may also enhance the functionality of the display screen of the first device. Additionally, the user's display experience of the first device can be improved based on the display function of the second device. For example, when the second device is a virtual reality device, the second device may enable the user to experience 3D visual effects.

The processing apparatus of the first device may determine at least one first display area in a first manner and determine a display mode including the at least one first display area as a first display mode. When the first device is in the first display mode, the first device may send a first content to a second device, and the second device is configured to display the first content of the first display area. In some embodiments, the display field of view of the second device may include at least one first display area, allowing users to access the first content displayed in each of the first display areas by the second device. Typically, when the first device is connected to an external display device with a display screen, the to-be-displayed content may only be output to the display screen of the external display device by physical display hardware information of the external display device. In some embodiments of the present disclosure, the first manner may determine at least one display area by virtual display hardware information, thereby implementing a virtual multi-screen display mode. This satisfies the output of different display information to different first display areas, improves display effects, and addresses issues such as occlusion or small display proportions when multiple to-be-displayed contents are displayed in the same display area.

In some embodiments of the present disclosure, determining at least one first display area in the first manner includes: obtaining, by the first device, physical display hardware information of the second device; creating virtual display hardware information corresponding to the physical display hardware information; and determining at least one first display area based on the virtual display hardware information.

The second device is configured to display the first content of the first display area, therefore the virtual display hardware information may be determined based on the physical display hardware information of the second device, so that the second device may better display the first content. The physical display hardware information of the second device may include display driver hardware information, graphics card hardware information, and parameters of the physical display screen, etc. The first device may create virtual display hardware information corresponding to the above physical display hardware information, such as creating at least one virtual graphics card and virtual display screen. The first device may send the created virtual graphics card and virtual display screen, and other virtual display hardware information to the operating system by the display driver of the first device, so that the operating system is capable of identifying the virtual display hardware information and creating at least one first display area based on the virtual display hardware information. Thereby, the first content may be displayed in the first display area. Specifically, each first display area is at the screen level, that is, when creating the first display area based on the virtual display hardware information, in addition to ensuring that the first display area is displayed within the field of view of the second device, it is also necessary to ensure that the display effect of the determined first display area when displaying the first content is better than the display effect when the first device with a display screen directly displays the first content. Therefore, in some embodiments of the present disclosure, the determined first display area is at the screen level rather than at the window level. For example, when the first device is an electronic device with a display screen, the size of each first display area may match the size of the display screen of the first device. Additionally, based on the physical display hardware information of the second device, the display field of view of the second device may be determined. When this display field of view of the second device is relatively large, the size of the display screen, based on the size of the display screen of the first device, may be enlarged, thereby determining the size of the first display area. When the first device itself does not have a display screen, the size of the first display area may be set based on the area range data of the largest display interface supported by the first device, ensuring that the determined first display area satisfies the virtual display hardware information, such as the resolution of the displayed content of the first display area meeting the range of resolutions in the virtual display hardware information. For example, when the first content includes video playback content corresponding to multimedia applications and document editing content corresponding to office applications, there may be two first display areas. The second device displays the video playback interface of multimedia applications in one of the first display areas and displays the document editing interface of office applications in another of the first display areas. When the second device displays the first content in the first display area, the displayed content corresponding to the first display area may be randomly assigned by the second device or may be specified by the first device. For example, the first device may specify the to-be-displayed content in each first display area according to user settings, that is, users determine the first content to be displayed in each first display area.

Further, creating the virtual display hardware information corresponding to the physical display hardware information includes: the first device obtaining first display parameter information of the first content, where the first display parameter information includes a number of to-be-displayed sub-content of the first content and/or display size information of each to-be-displayed sub-content; and the first device creating the virtual display hardware information based on the physical hardware information and the first display parameter information.

Each virtual display hardware information is configured to display the corresponding to-be-displayed sub-content of the first content in the matching first display area. The virtual display hardware information is created based on the physical display hardware information of the second device, and the first display area is determined based on the virtual display hardware information, enabling the first display area to function similarly to the display screen corresponding to the physical display hardware, thereby allowing the second device to display the first content of the first display area. The first display area may be multiple, and the area range of each first display area may correspond to the entire screen range of the physical display screen. Therefore, the virtual display hardware information may be further optimized based on the first display parameter of the first content, thereby improving the display effect of at least one first display area determined by this virtual display hardware information when displaying the first content. Specifically, the first display parameter information may include the number of to-be-displayed sub-content of the first content and/or the display size information of each to-be-displayed sub-content. The number of each set of virtual display hardware information may be determined by the number of to-be-displayed sub-content of the first content, so that a first display area is determined by a set of virtual display hardware information. For example, when the first device is an electronic device with a physical display screen, the first content includes the display interface corresponding to each application currently displayed on the physical display screen. The application includes social applications, video applications, and document applications, and the to-be-displayed sub-content of the first content may include the chat interface corresponding to social applications, the video playback interface corresponding to video applications, and the document editing interface. Correspondingly, there may be three first display areas, each for displaying the above to-be-displayed sub-contents, which enables each to-be-displayed sub-content to be independently displayed in the corresponding first display area without multiple to-be-displayed sub-contents being displayed in the same display area, thereby achieving the purpose of expanding the display and improving the user experience. The display size information of the to-be-displayed sub-content may be used to determine the display parameters in the virtual display hardware information, such as the display size information of the display area corresponding to the virtual display hardware information, and in order to display the content clearly in the display area corresponding to the display size, the display resolution parameter may also be determined. Therefore, at least one first display area that meets the actual display requirements may be determined, and the to-be-displayed sub-content corresponding to the first content may be displayed in the matching first display area, which improves the experience effect.

The second device is configured to display the first content of the first display area, that is, the first content of the first display area may be displayed by the second device. In order to better display the content, determining the first display area is based not only on the physical hardware information of the second device, but also on the spatial display parameters corresponding to the second device, such as information about the user's field of view corresponding to the second device. Specifically, the first device creating virtual display hardware information based on the physical hardware information and the first display parameter information, includes: obtaining, by the first device, at least one spatial display parameter of the second device; determining display position information corresponding to each to-be-displayed sub-content based on the correspondence between the display size information and the spatial display parameters of each to-be-displayed sub-content; and creating virtual display hardware information based on the physical hardware information, such that each virtual display hardware information is capable of displaying the corresponding to-be-displayed sub-content of the first content in the first display area that matches the display position information.

Figure 3:
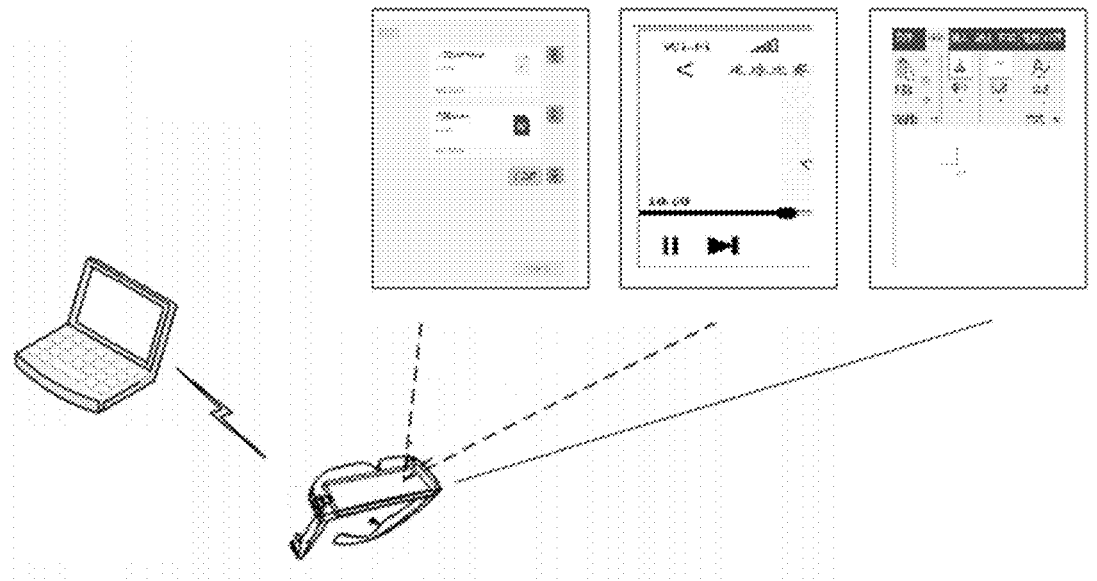
FIG. 3 illustrates a scene corresponding to a first display mode provided in some embodiments of the present disclosure.

The second device may be a wearable display device. For example, the second device may be AR glasses. With the optical system of the AR glasses, the user visually perceives that at least one first display area exists in the display space. The first device obtains at least one spatial display parameter of the second device. The spatial display parameter may be the overall spatial parameter perceived by the user based on the second device, such as the spatial parameter of the 360-degree display space that can be perceived by the second device. The spatial display parameter may also correspond to the spatial parameters of each to-be-displayed sub-content, such as the display position parameters of each to-be-displayed sub-content corresponding to the user's field of view of the second device. For example, as shown in FIG. 3, the spatial display parameter characterizes the display space of the second device as a 180-degree display space, and each first display area may be displayed side by side in the display space of the second device. Furthermore, based on the correspondence between the spatial display parameter and the display size information of each to-be-displayed sub-content, the display position information of each to-be-displayed sub-content may be determined. That is, the first display area corresponding to each to-be-displayed content may be reasonably arranged according to the display space of the second device, so that the user may better view each to-be-displayed sub-content in the first display area within the display space of the second device.

The first device in the first display mode sends the first content to the second device, enabling the second device to display the first content of the first display area. When obtaining the display instruction of the second content, the first device switches to the second display mode and sends the second content to the second device.

Where, the second content refers to a content that, when displayed by the second device in the first display area corresponding to the first display mode, cannot achieve a display effect matching the expected display effect of the second content. For example, the second content may be a specific content output by a video software. When the second device displays in the first display area corresponding to the first display mode, the second device may only display the common parts of the display interface corresponding to the video software, such as the title bar and status bar, but cannot output the specific content in the window that displays the video content output by the video software. For example, the window displays a black screen. The display instruction of the second content may be an instruction from the user to display the second content, or the display instruction of the second content may be an update instruction when the first content is updated to the second content. For example, when the second content is a video content in a specific format, and this specific format of video content cannot be displayed in the window for displaying video content in the video output interface corresponding to the first display area, then the window may show a black screen or a message indicating the inability to output content. Furthermore, when the first display area displays the first content in full screen and the first content is updated to the second content, the full screen interface may go black, etc. After the first content finishes playing, the second content needs to be automatically played in sequence, and a display instruction of the second content is generated at this time.

In some embodiments of the present disclosure, the first device switching to the second display mode includes at least one of the following:

in response to the first device in the first display mode, sending the second content to the second device, and when the second device fails to display the second content, the first device switches to the second display mode; and in response to the first device in the first display mode, parsing the second content, and when the parsing result meets a target condition, the first device switches to the second display mode.

When the first device in the first display mode obtains a display instruction to display the second content, the first device may send the second content to the second device. The second device fails to display the second content in the first display area corresponding to the first display mode, that is, the second content cannot be presented in the first display area with its expected display effect. For example, the first display area displays the first content, and the first content corresponds to the interface for playing the video by the browser. When the video content is updated to the second content, the video content output window playing the video by the browser in the first display area cannot output a video picture that substantially matches the second content. For example, when the second content is displayed in the first display area, a black screen, garbled display, or error message prompt appear wholly or partially in the first display area, which may be determined that the second device fails to display the second content. At this time, the second device may send the information indicating the inability to display the second content correctly to the first device, so that the first device switches to the second display mode. The second device is configured to display the second content of the second display area corresponding to the second display mode. Alternatively, after the user cannot obtain the second content by the second device, the user may create a switching instruction to control the first device to switch to the second display mode. After the first device switches to the second display mode, the second device is capable of displaying the second content of the second display area, that is, the second content displayed in the second display area at this time is consistent with the expected display effect of the second content, ensuring that the second content is displayed as expected and also maintaining the user's continued experience of the better visual effects provided by the second device.

In some embodiments of the present disclosure, for determining the first display area, the first display mode only utilizes the physical display hardware information related to the virtual multi-screen technology of the second device to generate at least one first display area. This generated first display area serves solely as an extended display screen for the first device. The first device outputs the first content, and the second device displays the first content by the first display area. Without simulating hardware-related information for rendering displayed content on the second device, when the second content includes virtual objects that require rendering in a virtual space, and due to the limitation of the first display mode to display the second content only in the first display area, rendering of three-dimensional virtual space cannot be accomplished. The second device fails to display the second content in the first display area. When switching to the second display mode, utilizing the physical display hardware of the second device, which includes all display function hardware of the second device, enables the rendering of virtual objects in the virtual space. Consequently, the image of the virtual objects rendered in the virtual space is output in the second display area. This resolves the issue of being unable to add new three-dimensional display object information to be rendered in a multi-screen display mode.

Correspondingly, the first device may pre-store content format information for parsing the to-be-displayed content, such as decoding information, decryption information for encrypted content, or content format conversion information, etc. When the first device is in the first display mode, the first device may parse the second content to obtain parsing results. When the parsing results meet a target condition, the first device switches to the second display mode. The target condition includes that the parsing results represent that the second content is unable be displayed in the first display area corresponding to the first display mode. Specifically, the first display mode is a display mode determined based on virtual display hardware information. Therefore, when the first device parses the second content, the first device uses information matching the virtual display hardware information to parse the second content and obtains parsing results.

In some embodiments, the second content includes multimedia data decrypted from an original content, and the original content may be decrypted based on decryption information determined by physical display hardware information. In response to the first device in the first display mode, parsing the second content and the first device switching to the second display mode when the parsing results meet a target condition, include: in response to the first device in the first display mode, decrypting the original content based on first decryption information; and when the first device fails to decrypt the original content based on the first decryption information, the first device switching to the second display mode.

Where, the first decryption information is decryption information determined by the first device based on virtual display hardware information, and the virtual display hardware information represents display hardware information simulated and generated by the first device. Since the original content is decryptable based on decryption information determined by physical display hardware information, the first device fails to decrypt the original content using the virtual display hardware information and then the first device switches to the second display mode.

Furthermore, the first device switching to the second display mode and sending the second content to the second device, include: in response to the first device switching to the second display mode, the first device decrypting the original content based on second decryption information to obtain the second content; and the first device sending the second content to the second device.

The second decryption information is decryption information determined by the first device based on the physical display hardware information of the second device. For example, the original content is a DRM (Digital Rights Management) file obtained based on DRM technology. DRM is a technology configured to manage the use rights of protected files (such as images, audio and video, etc.). The platform that provides files may use DRM technology to encrypt files to obtain DRM files. Subsequently, an application corresponding to the DRM file may obtain the DRM file from the platform that provides the file. The application may decrypt and use the DRM file only when the application stores the key provided by the platform that provides the file. Specifically, when the platform that provides the DRM file receives a usage request from the application using the DRM, the platform may send the DRM file and the public key corresponding to the DRM file to the application. After the application receives the DRM file and the corresponding public key, the application may generate decryption information based on the private key corresponding to the application and the received public key. The DRM file is decrypted based on this decryption information. When the decryption is successful, the DRM file may be used. The private key of the application is related to the physical hardware information of the device corresponding to the application, that is, the decrypted DRM file can only be obtained through the corresponding physical hardware information. For example, when the DRM file is a video file, the video file may be decrypted based on the physical display hardware information corresponding to the application that plays the video file, resulting in the decrypted video file. In addition, the second content may also be content generated by other asymmetric encryption methods (such as document content encrypted by RSA technology). In asymmetric encryption technology, a key pair is generated, including a public key and a private key. The private key can be encapsulated in the physical hardware of the device before the device leaves the factory. In some embodiments of the present disclosure, the private key required to decrypt the display content is encapsulated in the physical display hardware of the second device. That is, only by using the private key in the physical display hardware of the second device combined with the public key can the second content encrypted by asymmetric encryption be decrypted and output. In some embodiments of the present disclosure, the video file in the above example is displayed by the second device, so it is necessary to ensure that the current display mode includes the physical display hardware information of the second device, that is, the first device switches to the second display mode, and the second display mode includes a second display area determined in a second manner. Determining the second display area in the second manner includes: the first device obtaining the physical display hardware of the second device and generating the second display area based on the physical display hardware information of the second device, thereby enabling the second device to display the second display area.

In some embodiments, when the first device parses that the current to-be-displayed second content fails to be displayed in the first display mode, the first device may obtain Extended Display Identification Data (EDID). From this Extended Display Identification Data, the first device obtains physical display hardware information of the second device. Based on this physical display hardware information, the second display area is determined. It is to be noted that since the physical display hardware information of the second device may correspond to a unique physical screen, there may be one corresponding second display area.

Figure 4:
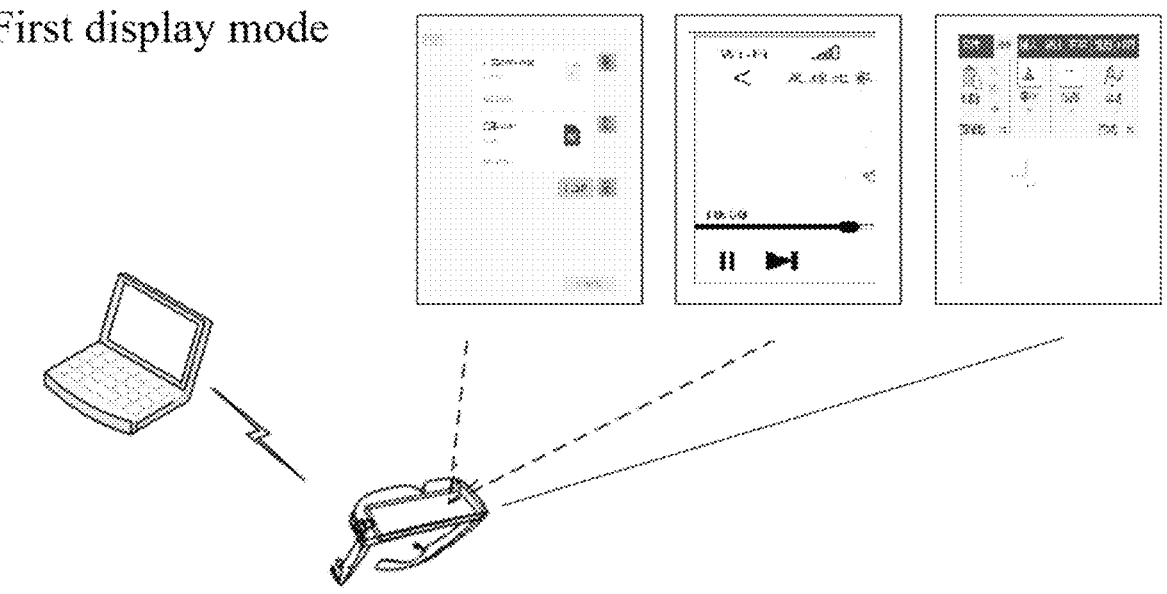
FIG. 4 illustrates scenes corresponding to different display modes provided in some embodiments of the present disclosure.
Figure 4:
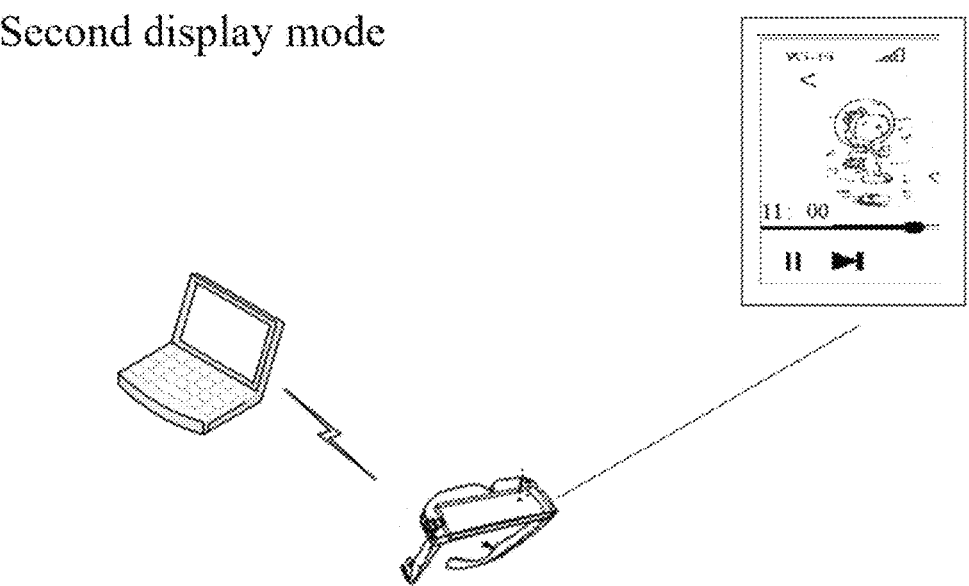

FIG. 4 is a schematic diagram illustrating a scene corresponding to different display modes provided in some embodiments of the present disclosure. The first device may be a laptop computer, and the second device may be VR glasses. In the first display mode shown in FIG. 4, the display space of the second device includes three first display areas, and each first display area displays different contents. Each first display area may display one display interface corresponding to an application, such as a chat interface, a video playback interface, and a document editing interface, respectively. When a copyrighted video file needs to be played in the video playback interface, as the video file is an encrypted file, the video file requires decryption information to decrypt. However, in the first display mode, all first display areas are generated using virtual display hardware information, and the decryption information corresponding to physical display hardware information is not included to maintain the virtual reality display effect provided by the second device. The first device may switch to the second display mode, utilizing the physical display hardware information of the second device to determine the second display area. The decryption information corresponding to the physical display hardware information is then used to decrypt the video file, and the decrypted video data is displayed in the second display area. Since the physical display hardware information corresponding to the second device corresponds to only one physical screen, the number of the second display area is one. Therefore, in this application scenario, transitioning from the first display mode to the second display mode changes from three display areas to one display area. Additionally, the remaining display area for playing the video file in the second display mode is different from the display area for playing the video file in the first display mode. The generation of these two display areas utilizes different display hardware information. The display area in the first mode is determined by the virtual display hardware information, while the display area in the second mode is determined by the physical display hardware of the second device.

Specifically, in some embodiments of the present disclosure, the second content is a target content including a partial updated content of the first to-be-displayed sub-content of the first content. The display position of the second display area matches the display position of the first to-be-displayed sub-content. The first device switching to the second display mode and sending the second content to the second device, include: the first device switching to the second display mode and sending the target content to the second device. In this implementation, the second content is the updated content on the first to-be-displayed sub-content of the original first content. For example, when the first to-be-displayed content in the first content is a video playback interface, the partially updated content is the video screen being played. When the first device switches from the first display mode to the second display mode, the original first display area is not retained. The video screen in the first display area is updated to the second display area, that is, the entire video playback interface is updated. Furthermore, to enhance user experience, the position of the first display area that displays the video playback interface may be recorded, and the generated second display area may also be displayed at that position. This may minimize the difference in visual effects for the user and ensure the user's visual experience.

In some embodiments of the present disclosure, in order to facilitate the switching of the first device from the second display mode back to the first display mode, the original first display area or the first content may also be processed when the first device switches from the first display mode to the second display mode.

In some embodiments of the present disclosure, the first device switching to the second display mode includes: the first device deleting the first display area determined in the first manner, or the first device ceasing to send the first content to the second device; and the first device switching to the second display mode.

When the first device switches to the second display mode, the first display area which is determined by the virtual display hardware information, fails to continue displaying. The first display area determined by the first manner may be no longer retained, that is, the first display area determined by the first manner in the first display mode may be deleted. In this way, even when the first content continues to be output, since the corresponding first display area does not exist, the first content fails to continue displaying. Correspondingly, the first content of the first display area may be no longer displayed. Regardless of whether the first display area corresponding to the first display mode is deleted or not, the first device ceases to send the first content to the second device. Even when a first display area exists, since there is no content output, the first display area does not display content either.

In some embodiments of the present disclosure, the first device switching to the second display mode and sending the second content to the second device, include: the first device deleting the first display area and continuing to output the target content in the first content to a target storage space; and the first device switching to the second display mode and sending the second content to the second device. When the first device is in the first display mode, the to-be-displayed content of the first display area comes from the target storage space. In this implementation, the target content in the first content may continue to be retained in the target storage space. Since the first display area is deleted, the target content in the target storage space fails to be output in the first display area, thereby preventing the user from accessing the first content.

Furthermore, this method also includes: the first device switching back to the first display mode from the second display mode, determining the target content in the target storage space as the first content and sending the first content to the second device.

In some embodiments of the present disclosure, the first device switching to the second display mode and sending the second content to the second device, include: the first device determining the third display area in a third manner, where the first device is configured to display contents of the third display area; the first device determining a target content in the first content and displaying the target content in the third display area; and the first device switching to the second display mode and sending the second content to the second device. The third manner and the second manner are of the same type, and the third manner and the first manner are of different types.

The first manner determines the display area based on virtual display hardware information, while the second manner and the third manner both determine the display area based on physical display hardware information. Specifically, the second manner may determine the display area based on the physical display hardware information of the second device, and the third manner may determine the display area based on the physical display hardware information of the first device and/or the third device. When the first device itself has a physical display screen, the third manner may determine the display area based on the physical display hardware information of the first device, and correspondingly, the third display area is the entire area of the physical display screen of the first device. When the first device itself does not have a physical display screen, a physical display screen may be obtained by connecting to the third device, that is, using the physical display screen of the third device as an external display screen of the first device. In this case, the third manner determines the third display area based on the physical display hardware information of the third device. The third display area is the physical display screen of the third device. When the first device may have a physical display screen itself and connect to the third device with a physical display screen, the physical display screen of the third device serves as an extended display screen of the first device. In this case, the third manner determine the third display area based on the physical display hardware information of both the first device and the third device. The third display area includes the physical display screen area of the first device and the physical display screen area of the third device. The first device determines the target content in the first content. The first device may determine all the first content as the target content, or the first device may determine part of the first content as the target content. When the first device determines part of the first content as the target content, the first device may determine the first content with higher user attention as the target content based on the interaction data between the user and the first content, such as gaze data. Alternatively, the first device may determine the content selected by the user in the first content as the target content. Then, the target content is displayed in the third display area, so that when the first device switches to the second display mode, the user can also access the target content through the third display area.

Furthermore, the method also includes: the first device switching back from the second display mode to the first display mode, determining the target content output in the third display area as the first content, and sending the first content to the second device.

In some embodiments of the present disclosure, the first device switching to the second display mode and sending the second content to the second device, include: the first device detecting the existence of the third display area; when the third display area exists, the first device displaying the target content in the first content in the third display area; when the third display area does not exist, the first device deleting the first display area and continuing to output the target content in the first content to the target storage space; and the first device switching to the second display mode and sending the second content to the second device. When the first device is in the first display mode, the to-be-displayed content of the first display area comes from the target storage space.

In this implementation, before the first device switches to the second display mode, the first device may detect the existence of the third display area determined based on the third manner. When the third display area exists, the target content is displayed in the third display area, which facilitates user viewing and subsequent continued output of the target content when switching back to the first display mode. When the third display area does not exist, the target content in the first content may only continue to be output to the target storage space. The target storage space is the storage space for obtaining the first content when the first display area displays the first content, enabling the target storage space to cache the target content in real time. Subsequently, when the second display mode is switched back to the first display mode, the target content may be retrieved from the target storage space and output as the first content to the first display area. Specifically, this also includes: the first device switching from the second display mode back to the first display mode, determining the target content in the target storage space as the first content, and sending the first content to the second device.

In practical application scenarios, the first device may be a computer, a host, or other devices with processing apparatuses, etc.; and the second device may be a device with a display apparatus, specifically wearable devices such as VR devices, AR devices, or XR devices, etc. The second content may be DRM content, the first display mode may be a virtual multi-screen mode, and the second display mode may be a physical screen mode. Specifically, when the first device is a laptop computer with a physical screen and the second device is VR glasses, in the virtual multi-screen mode, the display includes the physical screen of the laptop computer and multiple virtual screens obtained by VR glasses. For the operating system of the laptop computer, these screens are identical, and contents can be output to different display screens. For example, each application's display interface is output to the corresponding screen. For virtual multi-screen applications of VR glasses, these screens may be spatially placed in the environment perceivable by the user by VR glasses. When the user moves, these virtual screens may remain fixed in the placement positions.

In the physical screen mode, the display includes the physical screen of the laptop computer and an external physical screen. The external physical screen refers to the physical screen of the VR glasses, which is connected to the computer by DP/HDMI. In this mode, the virtual displays created by the virtual multi-screen mode are all deleted. Since the VR glasses are physically connected to the laptop computer, the VR glasses become a standard physical display. The HDCP (High-bandwidth Digital Content Protection) function on the device can work normally, meeting the secure connection requirements of DRM content and allowing DRM content to be displayed properly in this physical display mode.

The above two modes respectively fulfill the display of multiple virtual screens and the output of protected content on a single physical screen. Users may switch between these two modes in the VR scene, thereby ensuring that DRM content may be output properly. In some embodiments of the present disclosure, there is no change in hardware, eliminating the need for additional hardware costs.

Figure 5:
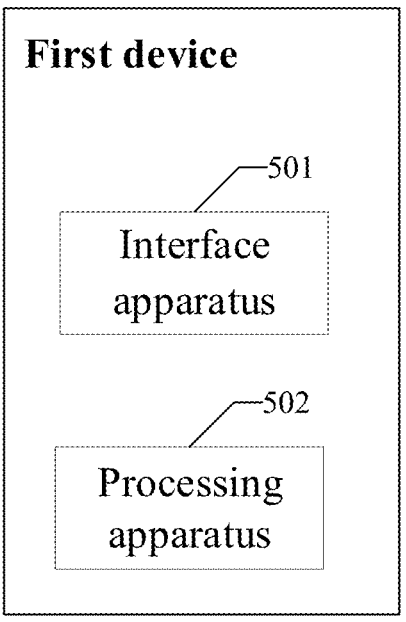
FIG. 5 illustrates the schematic structural diagram of a first device provided in some embodiments of the present disclosure.

Some embodiments of the present disclosure also provide a display system. The display system may include a first device, as shown in FIG. 5. FIG. 5 illustrates a structural schematic diagram of the first device provided in the present disclosure. The first device may include: an interface apparatus 501 for connecting to a second device; and a processing apparatus 502 for determining to-be-displayed content and determining display area.

The first device includes a first display mode and a second display mode. In the first display mode, the processing apparatus determines at least one first display area in a first manner and sends a first content to a second device, enabling the second device to display the first content of the first display area. In the second display mode, the processing apparatus determines a second display area in a second manner and sends a second content to the second device, enabling the second device to display the second content of the second display area.

The first manner and the second manner are based on different display hardware information for determining display areas.

Optionally, the processing apparatus is further configured for: switching from the first display mode to the second display mode;

Optionally, the processing apparatus is specifically configured to perform at least one of the following: in response to being in the first display mode, sending the second content to the second device, and when the second device fails to display the second content, switching to the second display mode; and in response to being in the first display mode, parsing the second content, and when the parsing result meets a target condition, switching to the second display mode.

Optionally, the first device further includes: a communication apparatus for obtaining a second content, where the second content is multimedia data decrypted from an original content, and the original content may be decrypted based on decryption information determined by physical display hardware information.

The processing apparatus is further configured to respond to being in the first display mode and decrypt the original content based on first decryption information. The first decryption information is decryption information determined by the processing apparatus based on virtual display hardware information, and the virtual display hardware information represents display hardware information simulated and generated by the processing apparatus. When decryption of the original content based on the first decryption information fails, the first device switches to the second display mode.

Optionally, the processing apparatus is further configured to respond to switching to the second display mode, decrypt the original content based on a second decryption information to obtain the second content, and send the second content to the second device. The second decryption information is decryption information determined by the physical display hardware information of the second device.

Optionally, when the processing apparatus determines at least one first display area in the first manner, the processing apparatus is specifically configured to: obtain physical display hardware information of the second device, create virtual display hardware information corresponding to physical display hardware information, and determine at least one first display area based on the virtual display hardware information; when the processing apparatus determines the second display area in the second manner, the processing apparatus is specifically configured to: obtain physical display hardware information of the second device; and generate a second display area based on the physical display hardware information of the second device, thereby enabling the second device to display the second display area.

Furthermore, the process of the processing apparatus creating the virtual display hardware information corresponding to the physical display hardware information includes: the processing apparatus obtaining first display parameter information of the first content, where the first display parameter information includes a number of to-be-displayed sub-content of the first content and/or display size information of each to-be-displayed sub-content; and creating the virtual display hardware information based on the physical hardware information and the first display parameter information, where each of the virtual display hardware information is configured to display the corresponding to-be-displayed sub-content of the first content in the matching first display area.

Optionally, based on the physical hardware information and the first display parameter information, the process of the processing apparatus creating virtual display hardware information includes: the processing apparatus obtaining at least one spatial display parameter of the second device; based on the correspondence between the display size information of each to-be-displayed sub-content and the spatial display parameter, determining display position information corresponding to each of the to-be-displayed sub-content; and based on the physical hardware information, creating the virtual display hardware information, thereby enabling each of the virtual display hardware information to display the corresponding to-be-displayed sub-content of the first content in the first display area that matches the display position information.

Optionally, the second content is a target content including a partial updated content of the first to-be-displayed sub-content of the first content, and the display position of the second display area matches the display position of the first to-be-displayed sub-content. The processing apparatus is further configured for: switching to the second display mode and sending the target content to the second device.

Optionally, when the processing apparatus switches to the second display mode, the processing apparatus is specifically configured for: deleting the first display area determined in the first manner or ceasing to send the first content to the second device; and switching to the second display mode.

Optionally, the processing apparatus is also configured to determine a third display area in a third manner. The first device includes a second display apparatus for displaying the third display area. The processing apparatus is configured for: determining a target content in the first content and sending the target content to the second display apparatus, such that the second display apparatus displays the target content in the third display area; and switching to the second display mode and sending the second content to the second device. The third manner and the second manner are of the same type, and the third manner and the first manner are of different types.

Optionally, the interface apparatus of the first device is configured to connect to a third device. The third device includes a third display apparatus, and the third display apparatus is configured for displaying the third display area.

Optionally, the first device further includes a storage apparatus for storing target contents.

Optionally, the processing apparatus is configured to detect the existence of the third display area. When the third display area exists, the target content in the first content is displayed in the third display area. When the third display area does not exist, the first display area is deleted, and the target content in the first content continues to be output to the storage apparatus, where being in the first display mode, the to-be-displayed content of the first display area comes from the storage apparatus. The processing apparatus switches to the second display mode and sends the second content to the second device.

Optionally, the processing apparatus is configured for: switching back from the second display mode to the first display mode, determining the target content output in the third display area as a first content, and sending the first content to the second device.

Correspondingly, the display system includes a second device. The second device includes a first display apparatus. The first display apparatus is configured to display a first content of a first display area, or the first display apparatus is configured to display a second content of a second display area.

Optionally, the second device also includes: a wearable apparatus for maintaining the positional relationship between the second device and the wearer of the second device; and the first display apparatus for enabling the wearer to perceive to-be-displayed contents.

Optionally, the second device also includes: a sensing apparatus for determining spatial posture information of the second device. The sensing apparatus transmits the spatial posture information to the first device through the interface apparatus, thereby enabling the first device to determine the first display area based on the spatial posture information.

In practical application scenarios, the second device may be a VR device, AR device, or XR device. In the first display mode, the optical system of the second device may be used to make the wearer of the second device visually perceive that multiple virtual display screens exist in the space and appear in a specific form. For example, three virtual display screens are connected and arranged in an arc shape, not only achieving the purpose of augmented display screens but also experiencing visual effects brought by the second device's technology itself. For example, when the second device is a VR device, users may experience powerful graphical visual effects without being limited by physical environmental conditions. When the second device is an AR device, this may provide users with sensory experiences where virtual information surpasses real-world perception, overlaying virtual objects onto the real environment. When the second device is an XR device, the second device may enhance user senses through digitalization during the user experience and integrate the world. When the second device is an MR device, the second device may enable real-time interaction between synthesized content and real content, enhancing the user's interactive viewing experience.

It should be noted that the specific implementations of various devices and apparatuses in this embodiment may refer to the corresponding content in the preceding text, which is not further described here.

The embodiments described in the present disclosure are described in a progressive manner, with each embodiment focusing on the differences from other embodiments. The common and similar parts among the various embodiments can be cross-referenced. For apparatuses disclosed in some embodiments of the present disclosure, as they correspond to methods disclosed in some embodiments of the present disclosure, the description is relatively simple, and relevant details may be referred to in the method section.

Those skilled in the art may further realize that the units and algorithm steps in some embodiments described in the present disclosure can be implemented using electronic hardware, computer software, or a combination thereof. To clearly illustrate the interchangeability of hardware and software, the above description has provided a general description of the components and steps of each example according to their functionality.

Whether these functions are performed in hardware or software depends on the specific application and design constraints of the technical solution. Those skilled in the art may employ different methods for implementing the described functionality in each specific application, but such implementations should not be considered as exceeding the scope of the present disclosure.

The steps of the methods or algorithms described in some embodiments of the present disclosure may be directly implemented in hardware, software modules executed by processors, or a combination thereof. Software modules may be placed in random access memory (RAM), memory, read-only memory (ROM), electrically programmable ROM, electrically erasable programmable ROM, registers, hard disks, removable disks, CD-ROMs, or any other form of storage medium known in the art.

The above description of the disclosed embodiments enables those skilled in the art to implement or utilize the present disclosure. It will be apparent to those skilled in the art that various modifications to these embodiments are obvious, and the general principles defined herein may be implemented in other embodiments without departing from the spirit or scope of the present disclosure. Therefore, the present disclosure is not limited to the embodiments shown in this document, but should encompass the widest scope consistent with the principles and novel features disclosed herein.

What is claimed is:

1. A method for displaying, performed by a first device, comprising:

sending a first content to a second device, wherein the first device is in a first display mode, the first display mode comprises at least one first display area determined in a first manner, and the second device is configured to display the first content of the first display area;

obtaining a display instruction of a second content; and switching to a second display mode and sending the second content to the second device, wherein the second display mode comprises a second display area determined in a second manner, and the second device is configured to display the second content of the second display area, wherein the first manner and the second manner are based on different display hardware information for determining display areas.

2. The method according to claim 1, wherein switching to the second display mode comprises at least one of following:

in response to the first device in the first display mode, sending the second content to the second device, and when the second device fails to display the second content, the first device switches to the second display mode; and/or in response to the first device in the first display mode, parsing the second content, and when a parsing result meets a target condition, the first device switches to the second display mode.

3. The method according to claim 2, wherein the second content is multimedia data decrypted from an original content, and the original content is decryptable based on decryption information determined by physical display hardware information; and wherein in response to the first device in the first display mode, parsing the second content, and when the parsing result meets the target condition, the first device switches to the second display mode, comprises:

in response to the first device in the first display mode, decrypting the original content based on first decryption information, wherein the first decryption information is decryption information determined by the first device based on virtual display hardware information, and the virtual display hardware information represents display hardware information simulated and generated by the first device; and when the first device fails to decrypt the original content based on the first decryption information, the first device switches to the second display mode.

4. The method according to claim 3, wherein switching to the second display mode and sending the second content to the second device comprise:

in response to the first device switching to the second display mode, decrypting the original content based on second decryption information and obtaining the second content, wherein the second decryption information is determined by the first device based on physical display hardware information of the second device; and sending the second content to the second device.

5. The method according to claim 1, wherein determining the at least one first display area in the first manner comprises:

obtaining physical display hardware information of the second device, creating virtual display hardware information corresponding to the physical display hardware information, and determining the at least one first display area based on the virtual display hardware information; and wherein determining the second display area in the second manner comprises:

obtaining the physical display hardware information of the second device, and generating the second display area based on the physical display hardware information of the second device, such that the second device to display the second display area.

6. The method according to claim 5, wherein creating the virtual display hardware information corresponding to the physical display hardware information comprises:

obtaining first display parameter information of the first content, wherein the first display parameter information comprises a number of to-be-displayed sub-content of the first content and/or display size information of each of the to-be-displayed sub-content; and creating, based on the physical hardware information and the first display parameter information, the virtual display hardware information, wherein each of the virtual display hardware information is configured to display a corresponding to-be-displayed sub-content of the first content in a matching first display area.

7. The method according to claim 6, wherein creating, based on the physical hardware information and the first display parameter information, the virtual display hardware information comprises:

obtaining at least one spatial display parameter of the second device;

determining display position information corresponding to each of the to-be-displayed sub-content, based on a correspondence between the display size information of each of the to-be-displayed sub-content and the at least one spatial display parameter;

creating the virtual display hardware information, based on the physical hardware information, such that each of the virtual display hardware information is capable of displaying the corresponding to-be-displayed sub-content of the first content in the first display area matched with the display position information.

8. The method according to claim 5, wherein the second content is a target content comprising a partial updated content of a first to-be-displayed sub-content of the first content, and a display position of the second display area matches a display position corresponding to the first to-be-displayed sub-content; and wherein switching to the second display mode and sending the second content to the second device comprise:

switching to the second display mode and sending the target content to the second device.

9. The method according to claim 1, wherein switching to the second display mode comprises:

deleting the first display area determined in the first manner, or ceasing to send the first content to the second device; and switching to the second display mode.

10. The method according to claim 1, wherein switching to the second display mode and sending the second content to the second device comprise:

determining a third display area in a third manner, wherein the first device is configured to display a content of the third display area;

determining a target content in the first content and displaying the target content in the third display area; and switching to the second display mode and sending the second content to the second device, wherein the third manner and the second manner are of the same type, and the third manner and the first manner are of different types.

11. The method according to claim 10, wherein switching to the second display mode and sending the second content to the second device comprise:

detecting the existence of the third display area;

when the third display area exists, displaying the target content in the first content in the third display area;

when the third display area does not exist, deleting the first display area and continuing to output the target content in the first content to a target storage space, wherein when the first device is in the first display mode, a to-be-displayed content of the first display area comes from the target storage space; and switching to the second display mode and sending the second content to the second device.

12. The method according to claim 10, further comprising:

switching back to the first display mode from the second display mode;

determining the target content output in the third display area as the first content; and sending the first content to the second device.

13. A display system comprising a first device, wherein the first device comprises:

an interface apparatus for connecting to a second device, and a processing apparatus for determining to-be-displayed contents and determining display areas; and wherein the first device comprises a first display mode and a second display mode, wherein in the first display mode, the processing apparatus is configured to determine at least one first display area in a first manner and send a first content to the second device, enabling the second device to display the first content of the at least one first display area; and in the second display mode, the processing apparatus is configured to determine a second display area in a second manner and send a second content to the second device, enabling the second device to display the second content of the second display area, wherein the first manner and the second manner are based on different display hardware information for determining display areas.

14. The display system according to claim 13, wherein first device is capable of switching between the first display mode and the second display mode, wherein for switching from the first display mode to the second display mode, the processing apparatus is further configured to at least one of following:

in response to the first device in the first display mode, send the second content to the second device, and when the second device fails to display the second content, the first device switches to the second display mode; and/or in response to the first device in the first display mode, parse the second content, and when a parsing result meets a target condition, the first device switches to the second display mode.

15. The display system according to claim 13, wherein the processing apparatus is further configured to:

obtain physical display hardware information of the second device, create virtual display hardware information corresponding to the physical display hardware information, and determine the at least one first display area based on the virtual display hardware information.

16. The display system according to claim 13, wherein the processing apparatus is further configured to:

obtain physical display hardware information of the second device, and generate the second display area based on the physical display hardware information of the second device, such that the second device to display the second display area.

17. The display system according to claim 15, wherein the processing apparatus is further configured to:

obtain first display parameter information of the first content, wherein the first display parameter information comprises a number of to-be-displayed sub-content of the first content and/or display size information of each of the to-be-displayed sub-content; and create, based on the physical hardware information and the first display parameter information, the virtual display hardware information, wherein each of the virtual display hardware information is configured to display a corresponding to-be-displayed sub-content of the first content in a matching first display area.

18. The display system according to claim 13, wherein the second device comprises:

a wearable apparatus for maintaining a positional relationship between the second device and a wearer of the second device; and a first display apparatus for enabling the wearer to perceive to-be-displayed contents.

19. The display system according to claim 18, wherein the second device further comprises a sensing apparatus for determining spatial posture information of the second device, wherein the sensing apparatus transmits the spatial posture information to the first device through the interface apparatus.

20. The display system according to claim 13, wherein the first device is further configured to connect to a third device, wherein the third device comprises a third display apparatus, and the third display apparatus is configured for displaying a third display area, wherein the third display area is configured to display a target content in the first content.

* * * * *